United States Patent [19]

Mizutani et al.

[11] Patent Number: 4,731,103
[45] Date of Patent: Mar. 15, 1988

[54] METHOD FOR PRODUCING GLASS PREFORM FOR OPTICAL FIBER

[75] Inventors: Futoshi Mizutani; Gotaro Tanaka, both of Yokohama, Japan

[73] Assignee: Sumitomo Electric Industries, Ltd., Osaka, Japan

[21] Appl. No.: 928,644

[22] Filed: Nov. 5, 1986

Related U.S. Application Data

[63] Continuation of Ser. No. 706,388, Feb. 27, 1985, abandoned.

[30] Foreign Application Priority Data

Mar. 1, 1984 [JP] Japan .................................. 59-39559

[51] Int. Cl.$^4$ ......................................... C03B 37/018
[52] U.S. Cl. ..................................... 65/312; 65/18.2; 65/29
[58] Field of Search ................ 65/3.12, 18.2, 29, 3.11; 350/96.33, 96.30

[56] References Cited

U.S. PATENT DOCUMENTS

| | | | |
|---|---|---|---|
| 3,129,087 | 4/1964 | Hagy | 65/29 X |
| 3,506,427 | 4/1970 | Griem | 65/29 X |
| 3,576,611 | 4/1971 | Obersby | 65/29 X |
| 4,225,330 | 9/1980 | Kakuzen | 65/18.2 |
| 4,280,829 | 7/1981 | Seth | 65/3.12 X |
| 4,311,503 | 1/1982 | Kellar | 65/29 |
| 4,314,837 | 2/1982 | Blankenship | 65/3.12 |
| 4,317,666 | 3/1982 | Faure | 65/29 X |
| 4,326,870 | 4/1982 | Bendit | 65/29 X |
| 4,378,985 | 4/1983 | Powers | 65/3.12 |
| 4,419,116 | 12/1983 | Nakahara | 65/3.12 |
| 4,478,622 | 10/1984 | Olshansky | 65/18.2 X |

FOREIGN PATENT DOCUMENTS 59-03027  1/1984  Japan .................................. 65/3.12

OTHER PUBLICATIONS

Izawa; The Transactions of the IECE of Japan, vol. E62, No. 11; Nov., 1979; pp. 779–785; "Continuous Fabrication Process for High-Silica Fiber Preforms".

*Primary Examiner*—Kenneth M. Schor
*Attorney, Agent, or Firm*—Cushman, Darby & Cushman

[57] ABSTRACT

A glass preform for an optical fiber having homogeneous distribution of bulk density in its radial direction is produced by a method comprising forming fine glass particles by jetting a gaseous glass material and a fuel gas from a burner, depositing the fine glass particles on a seed rod to form a soot rod with measuring a temperature of a part of the soot rod on which the glass particles are being deposited so as to control said temperature, and then sintering the soot rod to obtain a transparent glass preform.

4 Claims, 8 Drawing Figures

METHOD FOR PRODUCING GLASS PREFORM FOR OPTICAL FIBER

This is a continuation of application Ser. No. 706,388, filed Feb. 27, 1985, which was abandoned upon the filing hereof.

FIELD OF THE INVENTION

The present invention relates to a method for producing a glass preform for an optical fiber. More particularly, it relates to an improved method for producing a glass preform for optical fiber by an outside vapor-phase deposition method (hereinafter referred to as "OVD" method).

BACKGROUND OF THE INVENTION

In the conventional OVD method, as shown in Fig. 1, fine glass particles are deposited on a seed rod 1 by jetting a gaseous glass raw material and a fuel gas from a burner 2 on the rod from a direction perpendicular to a longitudinal axis of the seed rod 1 while rotating the seed rod around its axis and reciprocally moving the seed rod 1 or the burner 2 in the axial direction of the seed rod 1 to form a soot rod 3 having a predetermined length and a symmetrical shape around the axis.

However, according the conventional OVD method, bulk density of the glass preform fluctuates in its radial direction, which results in cracking of the produced soot and fluctuation of concentration of an additive (eg. fluorine) in the radial direction, which additive is added when the soot is sintered. The reasons for these drawbacks are as follows:

In the conventional OVD method, a distance between the burner and the axis of the seed rod is fixed and the jetting rates of the glass raw material and the fuel gas are kept constant. The temperature of a part of the soot rod on which the fine glass particles are being deposited varies with the growth of the soot rod because the distance between the burner and said part of the soot rod becomes closer, and heat capacity of the soot rod and cooling efficiency vary. The variation of the temperature of said part of the soot rod results in the fluctuation of the bulk density of the soot rod in its radial direction, which leads to the soot cracking, the fluctuation of the additive concentration in its radial direction and/or formation of bubbles in the soot rod.

SUMMARY OF THE INVENTION

One object of the invention is to provide a glass preform which has desired distribution of bulk density and does not suffer from cracking or the fluctuation of the additive concentration in its radial direction.

Another object of the invention is to provide an improved method for producing a glass preform for an optical fiber by the OVD method, by which a glass preform having desired distribution of bulk density and not suffering from cracking or the fluctuation of the additive concentration in its radial direction is produced Accordingly, the present invention provides a method for producing a glass preform for an optical fiber, comprising forming fine glass particles by jetting a gaseous glass material and a fuel gas from a burner, depositing the fine glass particles on a seed rod to form a soot rod with measuring a temperature of a part of the soot rod on which the glass particles are being deposited so as to control said temperature, and then sintering the soot rod to obtain a transparent glass preform.

DETAILED DESCRIPTION OF THE DRAWINGS

The present invention will be illustrated by making reference to the accompanying drawings by way of example.

Figure 1:
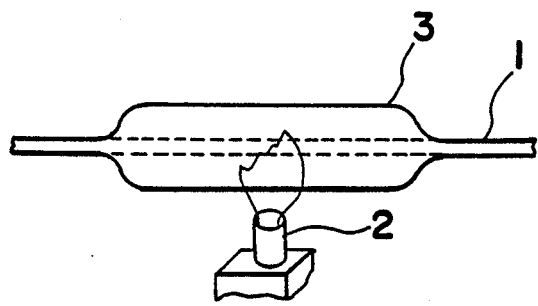
FIG. 1 schematically shows the conventional OVD method.
Figure 2:
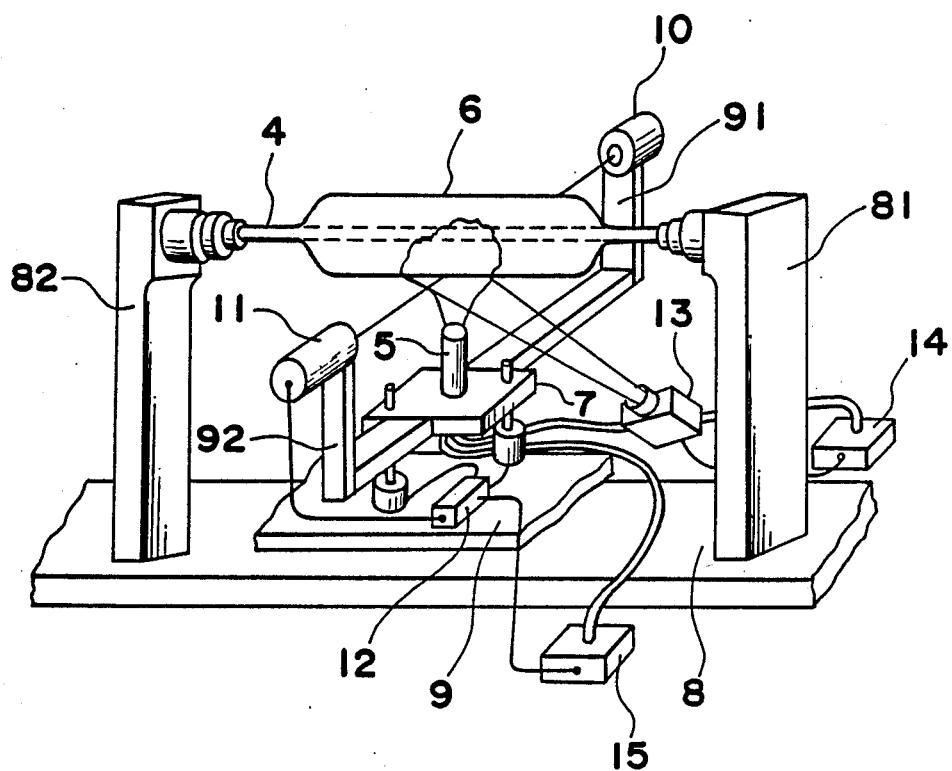
FIG. 2 schematically shows a method of the invention.

FIG. 2 schematically shows the method of the present invention. A seed glass rod 4 is horizontally supported by a pair of supporting members 81 and 82. From a burner 5, a gaseous glass raw material and a fuel gas containing oxygen and hydrogen are jetted on the rotating seed rod 4 from a direction perpendicular to the axis of the seed rod 4. The jetted material reacts to form fine glass particles, which are deposited on the seed rod to form a soot rod 6. The burner 5 is mounted on a bed plate 7 which has means for moving the burner in the direction perpendicular to the horizontal axis of the seed rod 4. The soot rod 6 is grown on the seed rod 4 by reciprocally travelling the seed rod 4 in its axial direction by means of travelling means 8 (eg. a glass turning machine) on which the supporting members 81, 82 are mounted, or reciprocally travelling the burner 5 in a direction parallel to the axial direction of the seed rod 1 by means of burner-travelling means 9 on which a burner base plate 7 is mounted. On the burner base plate 7, arms 91 and 92 are mounted and support a He-Ne laser source 10 and a receptor 11, respectively. When the distance between the soot rod 6 and the burner 5 is controlled during the deposition of the fine glass particles on the soot rod, the position of the burner base plate 7 is adjusted by means of controlling means 12 so as to keep the quantity of laser light received by the receptor 11 constant. The temperature of the part of the soot rod on which the fine glass particles are being deposited is measured by a surface pyrometer 13, and a jetting rate of the fuel gas is adjusted by means of a fuel gas controlling means 14 so that the temperature of said part of the soot is kept at a predetermined temperature at which the soot rod having a desired bulk density is produced.

The first embodiment of the invention in which the jetting rate of the glass raw material is kept constant will be explained.

Figure 3A:
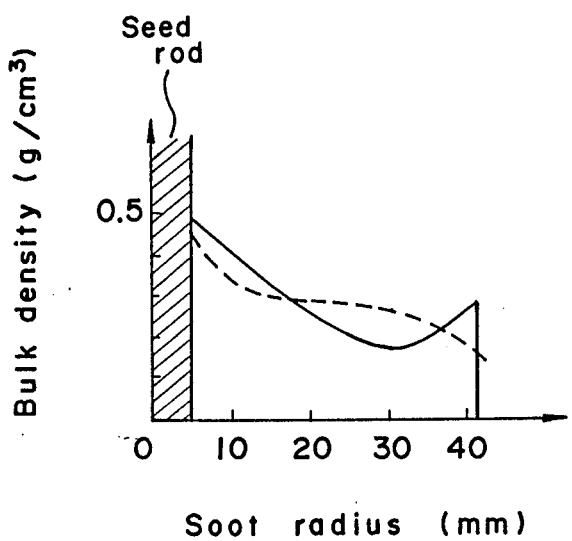
FIGS. 3A, 3B, 3C and 3D show distribution of bulk density in a radial direction of a soot rod which is produced by the conventional OVD method or the method of the FIG. 4 shows yield of the glass raw material in the radial direction of a soot rod.

The distribution of the bulk density of the soot rod 6 is shown in FIG. 3A. In FIG. 3A, the solid line represents the distribution of the bulk density of the soot rod produced by the conventional method in which the distance between the rotating axis of the soot rod 6 and the burner 5 is kept constant and the jetting rates of the glass raw material, oxygen gas and hydrogen gas are 0.8 liters/min., 9.5 liters/min. and 9.5 liters/min., respectively. In the conventional method, the soot rod is cracked when its diameter reached to about 80 mm. As is seen from FIG. 3A, the distribution of the bulk density fluctuates in the radial direction of the soot rod.

Figure 3B:
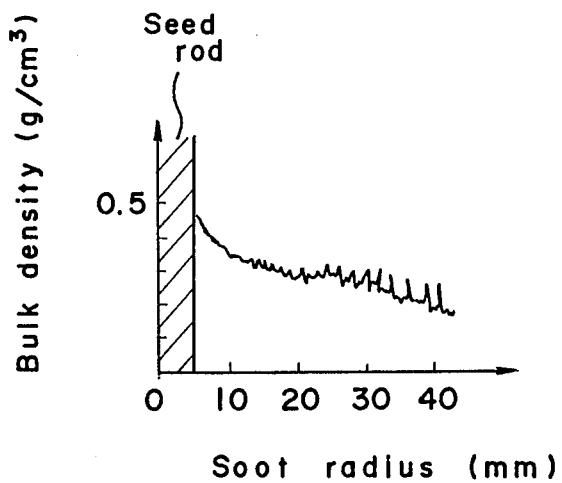

The broken line represents the distribution of the bulk density of the soot rod produced by the method of the invention, in which the jetting rates of the glass raw material and oxygen gas are the same as in the conventional method but the jetting rate of hydrogen gas is controlled so that the temperature of the soot rod is kept at 500° C. to obtain the soot rod having the bulk density of 0.3 g/cm$^3$. The soot rod is grown to an outer diameter of 80 mm while the jetting rate of hydrogen gas is changed from 8.2 liters/min. to 8.9 liters/min. However, after the outer diameter of the soot rod becomes larger than 60 mm, namely the radius of the soot rod becomes larger than 30 mm, the bulk density of the soot rod tends to decrease and to depart from the intended bulk density. When the bulk density of the soot rod is measured more precisely, it has a distribution shown in FIG. 3B, from which it is understood that the layers having the higher bulk density and the lower bulk density are alternately produced and the soot rod has an annualr ring structure.

It has been found that such an annular ring structure of the soot rod may be due to the fact that the temperature difference between the bottom portion and the side portion of the soot rod increases as the diameter of the soot rod becomes larger. In this embodiment, since the temperature is measured only at the bottom portion of the soot, the average temperature of whole soot rod is underestimated so that the average bulk density is controlled at a lower level. In addition, the soot rod is further grown under the same condition, it cracks when its diameter reaches 90 mm.

Therefore, although the control of the jetting rate of the fuel gas makes it possible to produce the soot rod having a larger outer diameter than that produced by the conventional method, practically, the maximum outer diameter of the soot rod has still its limit.

Thus, the method of the invention is further improved by controlling the distance between the surface of the soot rod and the burner.

In the preferred embodiment shown in FIG. 2, the distance between the soot rod 6 and the burner 5 is adjusted by moving the burner base plate 7 so that the quantity of the laser light received by the receptor 11 is kept constant. In addition, the jetting rate of the fuel gas is controlled by the fuel gas controlling means 14 so as to keep the temperature of the part of the soot rod on which the fine glass particles are being deposited at a temperature at which the desired bulk density of the soot rod is achieved.

More precisely, the distance between the soot rod and the burner is kept constant as follows:

Laser light is emitted from the laser source 10 located on one side of the soot rod 6 in a direction perpendicular to both the longitudinal axis of the soot rod and the central axis of the burner and passes a point which is on the surface of the soot 6 and on the extended line from the central axis of the burner and selected according to a desired bulk density of the soot rod to be produced and then is received by the receptor 11 located on the opposite side of the soot rod 6. The burner is moved in its axial direction so as to keep the received quantity of laser light at a predetermined level, for example, at half of the amount of the emitted light.

Figure 3C:
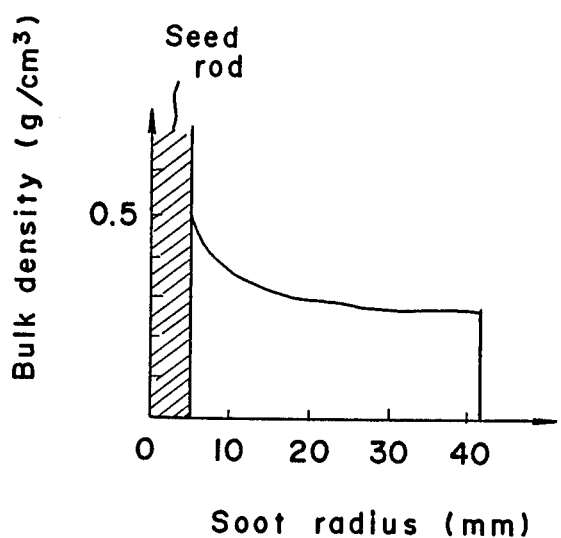

In this manner, the soot rod is produced by jetting the glass raw material and oxygen gas at rates of 0.8 liters/min. and 9.5 liters/min., respectively and adjusting the jetting rate of hydrogen gas so that the temperature of the part of the soot rod on which the glass particles are being deposited is kept at a temperature at which the soot rod having the bulk density of 0.3 g/cm$^3$ is produced. The rate of hydrogen gas is changed from 8.2 liters/min. to 9.7 liters/min., and the distribution of the bulk density is substantially constant at 0.3 g/cm$^3$ in the radial direction as shown in FIG. 3C.

Figure 4:
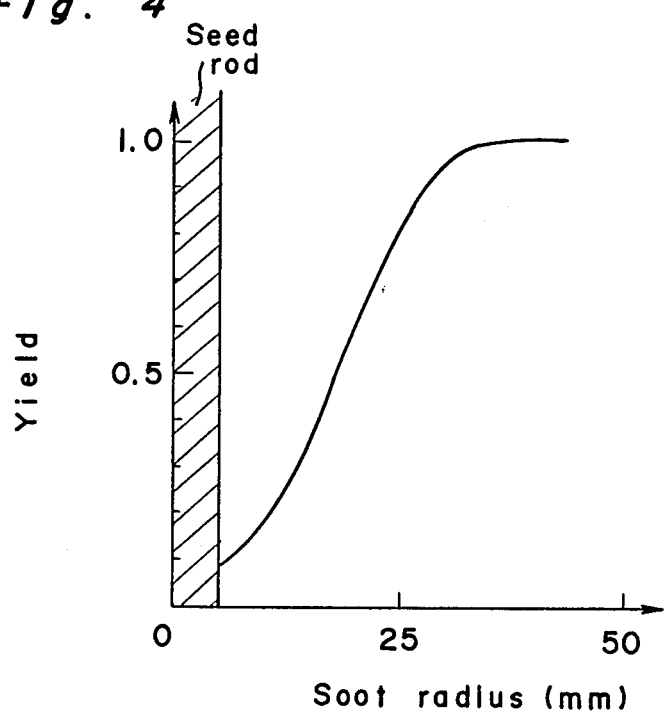

FIG. 4 shows the dependency of the yield of the deposited raw material on the diameter of the soot rod in the above method. As shown in FIG. 4, the yield of the deposited raw material abruptly increases as the soot rod grows, and it is higher than 90 % when the diameter of the soot rod is larger than 60 mm. From this result, it is assumed that there is present the maximum jetting rate of the raw material depending on the diameter of the soot rod. Thus, the invention further provides a method for jetting the raw material at the maximum rate while maintaining the yield of the raw material at a certain high level.

Figure 3D:
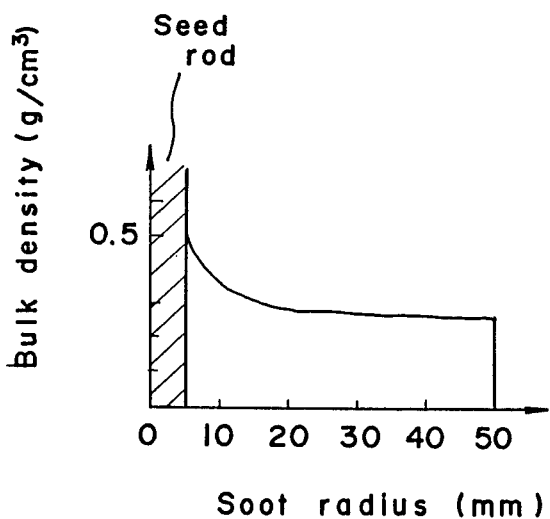
Figure 5:
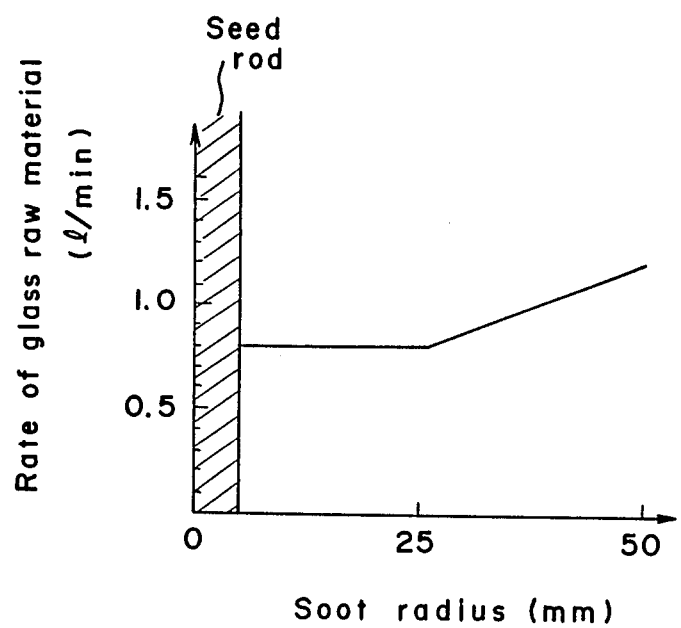
FIG. 5 shows a predetermined amount of the glass raw material in the radial direction of a soot rod.

In the embodiment shown in FIG. 2, the movement of the burner base plate 7 is output of the controlling means 12 and input in raw material controlling means 15 as a comparable indication of the outer diameter of the soot rod 6. Then, the jetting rate of the raw material is adjusted as shown in FIG. 5. By jetting oxygen gas at a rate of 9.5 liters/min., keeping the distance between the burner 5 and the soot rod surface constant and jetting hydrogen gas to keep the surface temperature of the soot rod at 500° C. at which the soot rod having the bulk density of 0.3 g/cm$^3$ is produced, the glass particles are deposited untill the diameter of the soot rod becomes 100 mm. The jetting rate of hydrogen gas varies from 8.2 liters/min. to 12.3 liters/min. and the bulk density of the produced soot rod is constant at 0.3 g/cm$^3$ as shown in FIG. 3D. The deposition rate of the fine glass particles is increased and the time required for deposition is reduced by 22%.

The yield of the raw material is further improved by measuring the distance between the burner and the soot rod with scanning laser instead of using the He-Ne laser coupler and controlling the position of the burner by taking account of the maximum distance determined from the jetting rates of the fuel gas and the raw material.

The thus produced soot rod is then sintered by a per se conventional method to convert it to a transparent glass preform for a optical fiber.

In the present invention, the raw materials may be any of known glass raw materials such as SiCl$_4$, GeCl$_4$, etc.

While the present invention has been described by reference to what is believed to be the most practical embodiments, it is understood that the invention may embody other specific forms not departing from the spirit of the invention. The present embodiments, therefore, should be considered in all respects as illustrative and not limited to the details disclosed herein but are to be accorded the full scope of the claims below so as to embrace any and all equivalent methods.

What is claimed is:

1. An outside vapor-phase deposition (OVD) method for producing an optical fiber glass preform with a desired bulk density distribution in the radial direction of said preform, comprising the steps of:
   forming glass soot particles by jetting and combusting a gaseous glass-forming material and a fuel gas from a burner in the presence of oxygen,
   depositing the glass soot particles along the length of a glass rod to form a soot-coated rod preform while simultaneously measuring the temperature of a part of the preform on which the glass soot particles are being deposited, the temperature which is measured being that of the deposited soot particles immediately after their deposit, and generating a first feedback signal indicative of the temperature, and then, controlling said temperature by adjusting the fuel gas jetting rate in response to said first feedback signal, wherein direct response and control is made with sufficient speed throughout the rod formation to correct deviations and to form a uniform product having a bulk density gradient in the radial direction, and then sintering the rod preform to obtain a transparent glass preform.

2. A method according to claim 1, wherein said controlling step includes the step of controlling said temperature by keeping a fixed distance between the soot rod and the burner and adjusting the fuel gas jetting rate according to the first feedback signal.

3. A method according to claim 2, wherein the keeping step includes the steps of keeping a fixed distance between the soot rod and the burner by emitting laser light, from a laser source located on a first side of the soot rod, in a diretion perpendicular to both the longitudinal axis of the soot rod and the central axis of the burner, and said laser light passing through a point on a line extending upwardly from the central axis of the burner, said point being selected according to a desired bulk density of the soot rod to be produced and receiving said laser light by a receptor located on a side opposite said first side of the soot rod and generating a second feedback signal indicative of the location of the soot rod and moving the burner according to said second feedback signal, in its axial direction so as to maintain the quantity of laser light received at a predetermined lever.

4. A method according to claim 3, wherein the jetting step includes the step of jetting the glass-forming raw material at a rate according to said second feedback signal.

* * * * *